(12) United States Patent
Kienzle et al.

(10) Patent No.: US 6,751,420 B1
(45) Date of Patent: Jun. 15, 2004

(54) INFRARED TRANSCEIVER ASSEMBLY FOR ASYMMETRIC DATA TRANSMISSION

(75) Inventors: Michael Kienzle, Whitby (CA); Albert John Kerklaan, Milton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,450

(22) Filed: May 18, 2000

(51) Int. Cl.[7] ................................................ H04B 10/00
(52) U.S. Cl. ...................... 398/135; 398/129; 398/131
(58) Field of Search ........................... 359/152, 159; 398/156, 128, 129, 135, 136, 137, 138, 139

(56) References Cited

U.S. PATENT DOCUMENTS

| | | | | |
|---|---|---|---|---|
| 4,975,926 A | * | 12/1990 | Knapp | 375/141 |
| 5,258,867 A | * | 11/1993 | Iggulden et al. | 359/159 |
| 5,416,627 A | * | 5/1995 | Wilmoth | 359/159 |
| 5,495,358 A | * | 2/1996 | Bartig et al. | 359/189 |
| 6,377,376 B1 | * | 4/2002 | Gfeller et al. | 359/152 |

* cited by examiner

*Primary Examiner*—Jason Chan
*Assistant Examiner*—Christina Y Leung
(74) *Attorney, Agent, or Firm*—Douglas W. Cameron; Anne V. Dougherty

(57) ABSTRACT

This invention relates to optoelectronic transceivers used in optical communication systems, and in specific to an optical transceiver configured for transmission and reception of optical signals or rays within an asymmetrically shaped optical profile. The invention provides a transceiver for communicating optical rays through relatively-positioned, shaped lenses while preventing the saturation of a photodetector by an adjacent LED, thereby avoiding any idling of the communication system, minimizing the transceiver's size, and isolating the optical profiles for optimum transmission and reception of optical rays. The transceiver may operate in a half duplex mode, while being capable of operating without additional modifications in a full duplex mode.

11 Claims, 8 Drawing Sheets

INFRARED TRANSCEIVER ASSEMBLY FOR ASYMMETRIC DATA TRANSMISSION

TECHNICAL FIELD OF THE INVENTION

This invention relates to optoelectronic transceivers used in optical communication systems, and more specifically to an optical transceiver configured for transmission and reception of infrared optical signals within an asymmetrically shaped optical profile.

BACKGROUND OF THE INVENTION

Some previous optical transceivers used optical profiles that were uniform or broad. Some previous transceivers used narrow optical profiles by using emitter and receiver lenses oriented in different angles aimed in different directions in relation to each other to reduce optical signal interference to improve communication. However, this increased manufacturing costs and the size of the transceiver package, as well as limiting utility.

The Infrared Data Association (IrDA) published a standard titled *Infrared Data Association Serial Infrared Physical Layer Specification* (V1.3, Oct. 15, 1998) which contained the Advanced Infrared (AIr) communications standard. This standard defines a physical link layer protocol having infrared (IR) detectors, such as a photodetector for detecting received infrared light, and an emitter, such as a light emitting diode (LED) for emitting light up to a transfer rate of 4 Mb/s within a predetermined asymetrically-shaped optical profile having orthogonal minor and major axes with concentric centres. Along the major axis, the half power level of the profile shape is located at the outward edges of a cone which subtends an angle of 60 degrees that straddles a line normal to the major axis, and along the minor axis, the half power level of the profile shape is located at the outward edges of a cone which subtends an angle of 15 degrees that straddles a line normal to the minor axis. The shape of the optical profile is designed to maximize the 'reach space' along a direction orthogonal to the major axis, and minimize the 'reach space' along a direction orthogonal to the minor axis. It was originally conceived that the major axis would be aligned in a horizontal direction relative to a floor surface so that optical communications could occur within a collaborative workplace environment.

Prior art optical transceivers have a photodetector and an LED positioned adjacent to each other on the same plane using dedicated lenses or surfaces disposed over the photodetector and the LED. The lenses typically had a circular-shaped outer perimeter. A problem with prior art devices when using a photodetector is excessive Link Turn Around Time (LTAT) which slows the communications. An LED can transmit enough light or optical rays to saturate an adjacent photodetector, thus rendering the photodetector temporarily unable to receive optical rays. The saturated photodetector requires a predetermined amount of time (i.e., LTAT) to recover and become normalized enough to then be ready to reliably detect incoming optical rays. With prior art configurations, the communication process was required to wait for the saturated photodetector to normalize each time the adjacent LED completed a transmission cycle. A familiar example of a saturated optical sensor is a human eye that is exposed to too much light. This causes the retina to become temporarily blinded (i.e., saturated). Before the eye can once again detect images, the eye must normalize during a recovery time after the light is removed.

Therefore, it is desirable to find a solution to overcome the problem of optically isolating the photodetector from the LED to avoid saturating the photodetector when the LED is adjacent to the photodetector for maintaining continued communication by eliminating the wait or idle time while the photodetector normalizes. Some prior art methods addressed this by interposing a physical barrier between the photodetector and the LED to block light or optical rays from leaving the LED and reaching the photodetector. However, this causes a transceiver to become larger and more complicated. This is undesirable for portable computers or small-sized computing devices like laptop computers or hand-held personal digital devices which require an optical transceiver of a small size or form factor. Therefore, another objective of this invention is to configure a transceiver having a small physical size for use in portable computing devices and the like.

Maurin et al in U.S. Pat. No. 5,811,798 Sealed Photoelectric Detector dated Sep. 22, 1998, along with Isaksson in WO patent 09201 6021A Optoelectronic Component dated Feb. 27, 1991, discloses using a solid barrier that is interposed between the transmitter (emitter) and receiver (photodetector) for preventing the transmitter from radiating light or optical rays into the adjacent receiver when using the transceiver in free-space condition. Apparently, there is no concern or regard to the overall physical size of the transceiver which is an important issue if the transceiver is to be used with small-sized electronic systems nor the optical profile.

Johnson et al in U.S. Pat. No. 5,359,446 Wide-angle, High-speed, Free-space Optical Communications System dated Oct. 25, 1994 discloses using an interposing solid barrier for preventing a transmitter (emitter) from radiating light into an adjacent receiver (photodetector). This appears to be designed for a limited-space condition that is isolated from true free space by a shroud in order to achieve full duplex mode communications in which the receiver and the adjacent transmitter operate simultaneously or asynchronously. It does not address optical profiles nor appear to be capable of operation in free field conditions. It appears that the asynchronous communication occurs in a limited space within the boundaries of an opaque shroud, and does not occur within true free space or unrestricted space.

Rosenberg in U.S. Pat. No. 5,506,445 Optical Transceiver Module dated Apr. 9, 1996 discloses a structure for an ordinary optical transceiver, and does not disclose a structure that can satisfy the AIr communications standard.

The above listed prior art does not suggest how to prevent degrading a transceiver's communication performance while satisfying limitations on size for use with a portable PC, especially when the transceiver communicates within an asymmetrically shaped optical profile. The transceiver's communication ability may be degraded by several factors that are not addressed in combination by the prior art, such as:

(a) optical rays from an LED lens that enters into the photodetector lens because of the relative positions of the lenses with respect to each other;

(b) an LED saturating an adjacent photodetector that causes communication delays; and (c) a photodetector lens that partially blocks the optical rays emitting from the LED lens thus creating a shadow that blocks optical rays being emitted from the LED.

To overcome these problems, the lenses could be separated further apart to keep the profiles of the emitter (LED) and receiver lenses from interfering with each other; however, the transceiver size will then be larger and thus less desirable for use in a portable PC.

Therefore, a solution should address, balance, and satisfy several technical problems in combination, such as:

(a) isolating the specific optical profiles for optimum condition of transmission and reception of optical rays;

(b) preventing a photodetector from becoming saturated by an adjacent LED, thus not allowing the communication process to idle unnecessarily;

(c) minimizing the transceiver's package size; and (d) communicating optical rays freely within the specified optical profiles.

The prior art does not suggest a solution for simultaneously addressing the above-mentioned problems in combination.

A lens may be used with an emitter (such as an LED) and a detector (such as a photodetector) to define the shape of the optical profile of light being emitted from or received by those devices. The profile resembles a spatial conduit having a non-contact, non-reflecting boundary in which the optical rays of communication are spatially confined while being directed to and from the emitter and detector. This spatial conduit is also called the Field-of-View (FOV). Asymmetrically shaped optical profiles were not used by computers (PCs) communicating with each other in prior art. The AIr communications standard requires the photodetector to receive optical rays and the LED to transmit optical rays within the asymmetrically shaped profile.

As will be known by those skilled in the art, an optical profile represents a spatial pathway having defined spatial boundaries which can advantageously be useful for optical communications. For example, a flashlight having an internal reflector outwardly projects a cone-shaped light beam or profile, and the space inside the cone has a density of light rays while the space outside the cone the density of light rays is much less. In reality, the transition from one region to the other is not abrupt, but rather assumes a Gaussian-shaped transition.

SUMMARY OF THE INVENTION

The present invention addresses the problems related with shadows that are created by adjacently located lenses, and saturation of the photodetector, while providing an optical transceiver configured for applications that demand a very small package size or form factor, and providing fast, reliable communication within an asymmetrically shaped optical profile.

One aspect of the present invention provides a transceiver having lenses positioned and aligned to allow the transceiver to be placed in a small-sized package, while giving the advantageous optical responsiveness for use in a limited space or footprint within computing or communication platforms, where the transceiver typically operates in half duplex mode, while maintaining capability to operate—without requiring further physical modifications—in communication systems that operate in full duplex mode.

Another aspect of the present invention provides an optical transceiver that communicates within an asymmetrically shaped optical profile by using ellipsoidally-shaped lenses. The emitter and receiver lenses are spatially positioned with their major axes staggered so that the optical profiles of lenses do not optically interfere with each other.

Yet another aspect of the present invention provides a transceiver for receiving and transmitting optical signals within an asymmetrically shaped optical profile including:

(a) an emitter group having at least one emitter module, the emitter module having:

(i) at least one emitter element for emitting an output optical signal in response to an output electrical signal;

(ii) an emitter lens element having orthogonal major and minor axes disposed in relation to the emitter element to confine light emitted from the emitter element within the profile;

(b) a receiver group having at least one receiver module, the receiver module having:

(i) at least one receiver element for producing an input electrical signal in response to receiving an input optical signal;

(ii) a receiver lens element having orthogonal major and minor axes disposed in relation to the receiver element to confine light received by the receiver lens within the profile onto the receiver element;

(c) the emitter and receiver modules disposed on the transceiver in staggered parallel spaced relation to each other with respect to their minor axes.

Another aspect of the present invention provides a transceiver in which:

(a) the emitter group includes a number of spaced emitter modules aligned in a column along their minor axes;

(b) the receiver group includes a number of spaced receiving modules aligned in a column along their minor axes;

(c) the columns of the modules are disposed in parallel spaced relationship with each other; and (d) the emitter modules are staggered with respect to the receiver modules in their respective columns.

Yet another aspect of the present invention provides a transceiver in which:

(a) the emitter group includes two spaced emitter modules aligned in a column along their minor axes, and the receiver group includes one receiver module; and (b) the receiver module is staggered with respect to the emitter modules and offset therebetween.

Still another aspect of the present invention provides a communication system for receiving and transmitting optical signals within an asymmetrically shaped optical profile including:

(a) an emitter group having at least one emitter module, the emitter module including:

(i) at least one emitter element for emitting an output optical signal in response to an output electrical signal;

(ii) an emitter lens element having orthogonal major and minor axes disposed in relation to the emitter element to confine light emitted from the emitter element within the profile;

(b) a receiver group having at least one receiver module, the receiver module including:

(i) at least one receiver element for producing an input electrical signal in response to receiving an input optical signal;

(ii) a receiver lens element having orthogonal major and minor axes disposed in relation to the receiver element to confine light received by the lens within the profile onto the receiver element;

(c) the emitter and receiver modules are disposed on the transceiver in staggered parallel spaced relation to each other with respect to their minor axes.

Preferably, the present invention can be configured so that the asymmetrically shaped profile has an oblong shape when viewed in a plane parallel to the major and minor axes of the lenses, the oblong shape having an oblong major axis corresponding to the major axes of the lenses, and an oblong minor axis corresponding to the minor axes of the lenses.

BRIEF DESCRIPTION OF THE DRAWINGS OF THE INVENTION

The invention will now be further described by way of example only and with reference to the following drawings wherein.

DETAILED DESCRIPTION OF THE PREFERRED EMBODIMENT

Figure 1:
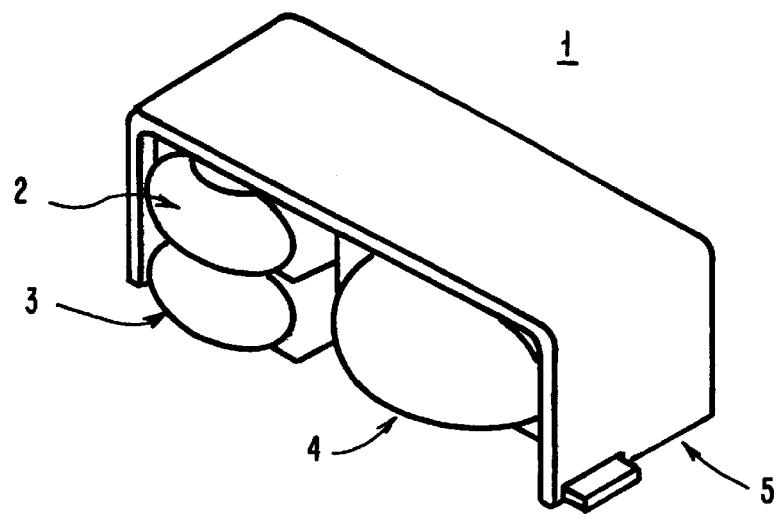
FIG. 1 shows a perspective of an embodiment of the present invention in which the lenses are spatially positioned to minimize the transceiver's size while maximizing communication performance.
Figure 6:
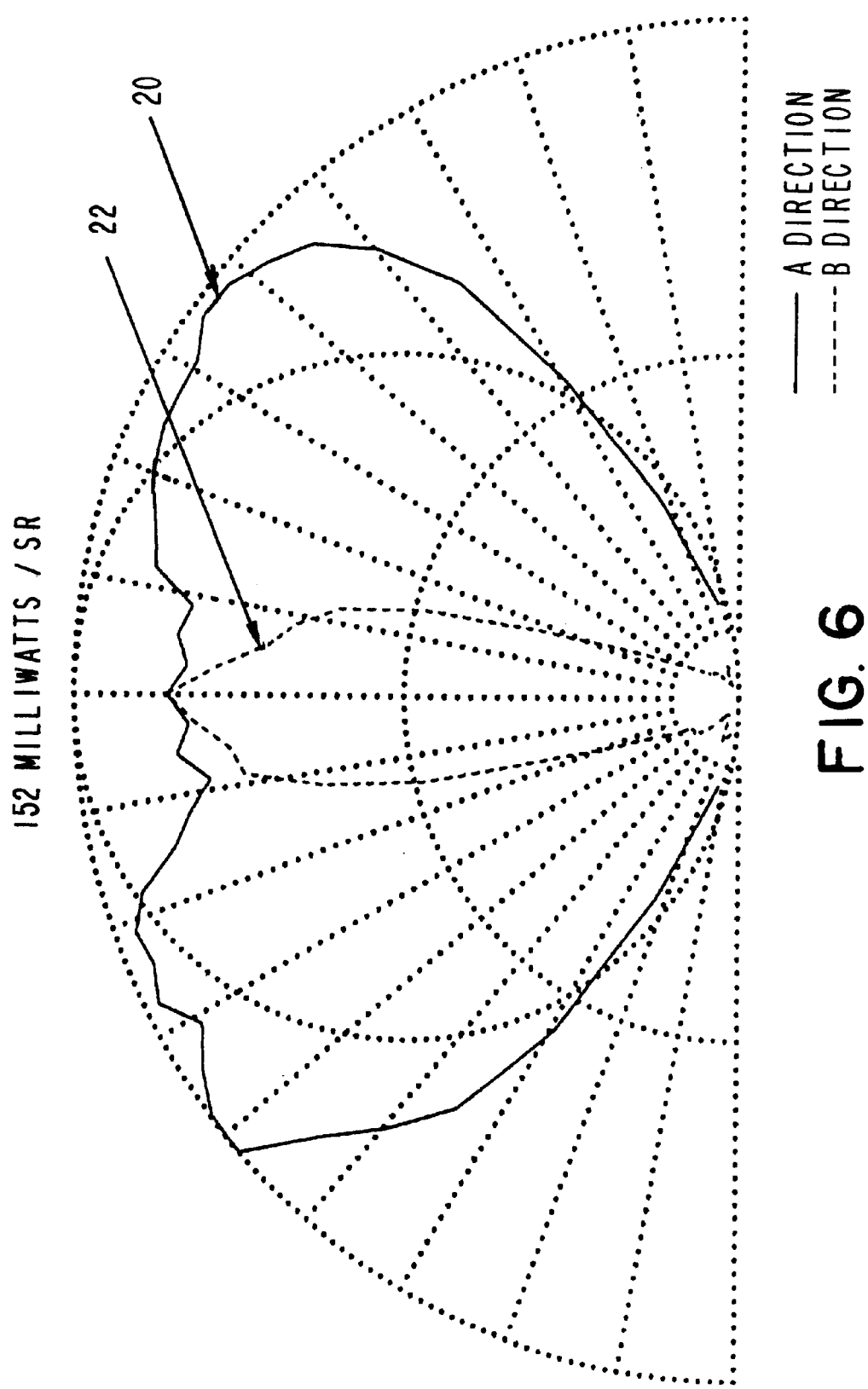
FIG. 6 shows a cross section of the optical power distribution along the major and minor axes of the lenses.

FIG. 1 shows a perspective view of a preferred embodiment of the present invention. This embodiment comprises an optical transceiver (1) which has a housing (5) and includes a first emitter lens (2) and a second emitter lens (3) each having minor axes in-line and spaced apart in one direction, such as in a vertical direction, and also has major axes along an orthogonal direction, such as in a horizontal direction. The transceiver (1) further includes a receiver lens (4) having its major axis parallel with the horizontal direction and its minor axis aligned along the vertical direction, and the major axis of the receiver lens (4) is spatially positioned equidistantly between the major axes of the emitter lenses (2, 3) while the minor axis of the receiver lens (4) is spaced apart from the minor axes of the emitter lenses (2, 3) for positioning the lenses (2, 3, 4) in a horizontally alternating manner so that the housing (5) of the optical transceiver (1) has a very small size without causing interference (shadowing) between the emitter and receiver lenses. The lenses (2, 3, 4) are contained within the housing (5). The emitter lenses (2, 3) and receiver lens (4) are shaped so that the optical rays will be substantially confined within a suitably shaped optical profile, such as the asymmetric profile as shown in FIG. 6. It has been found that a lens shape that is a half ellipsoid produces an asymmetrically shaped optical profile that satisfies the AIr communications standard.

Figure 2:
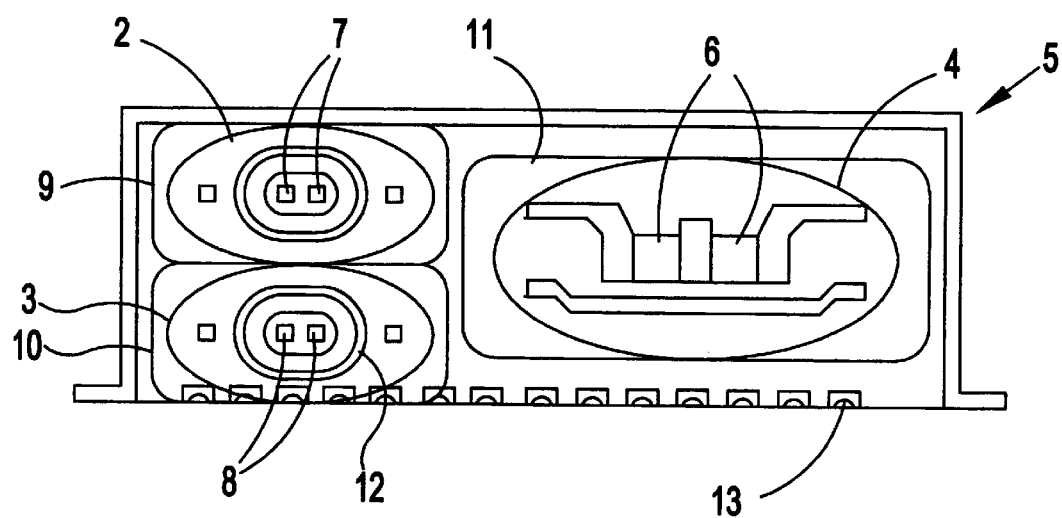
FIG. 2 shows a front view of the embodiment of the present invention.

FIG. 2 shows the front view of the preferred embodiment of the present invention with the lenses (2, 3, 4) facing towards the viewer, that is the direction of optical communications in this illustration. The optical transceiver (1) includes two emitter modules (9, 10) each having an emitter lens for directing optical rays radiated by LEDs (7, 8). This embodiment illustrates a configuration using a pair of LEDs (7, 8) in each emitter module to generate sufficient optical power output in this embodiment. Lenses (2, 3, 4) are spatially positioned in a columnar fashion to optimize the communication performance and minimize the physical size of the transceiver (1). The optical transceiver (1) includes a receiver module (11) having a receiver lens (4) for converging optical rays toward two photodetectors (6). This embodiment of the present invention illustrates a configuration in which two photodetectors (6) are used in the receiver module (11) for reception, and shows the lenses (2, 3, 4) spatially positioned with respect to each other for optimum communication performance and a small transceiver (1) size. The housing (5) contains the modules (9, 10, 11) within a very small package as a result of their relative positioning.

In each emitter module (9, 10), reflector (12) is used to improve the optical output of the two LEDs. Electrical contacts (13) which connect to the modules (9, 10, 11) can be used to connect the transceiver (1) to power and provide pathways for signals with a communications system (not shown) or a computer system (not shown), or the like.

The receiver module (11) of the optical transceiver (1) includes one receiver lens (4) for directing optical signals to two photodetectors (6). If increased sensitivity is required, additional receiver modules (11) can be used in a stacked (columnar) arrangement similar to the stacked (columnar) arrangement that is used for the emitter modules (9, 10), while keeping the major axes of the receiver modules (11) in a staggered relationship with respect to the major axes of the emitter modules (9, 10) to minimize the size of the housing (5) of the transceiver (1), which prevents shadowing to enable unencumbered high-speed communications within the optical profiles of the lenses (2, 3, 4), and prevents the LEDs (7, 8) from saturating the photodetector (6). A saturated photodetector (6) will slow the communication.

The relative sizes and shapes of the emitter lenses (2, 3) and the receiver lens (4) may be different. For instance, a larger receiver lens (4) may physically block or interfere with the optical profile of the smaller emitter lenses (2, 3) and thus interfere with the communications along the optical profile of the smaller emitter lenses (2, 3), especially if the major axes of the lenses (2, 3, 4) are placed near each other. This problem is overcome by the preferred embodiment in which the embodiment spatially positions the lenses (2, 3, 4) for unencumbered communication of optical rays.

Figure 3:
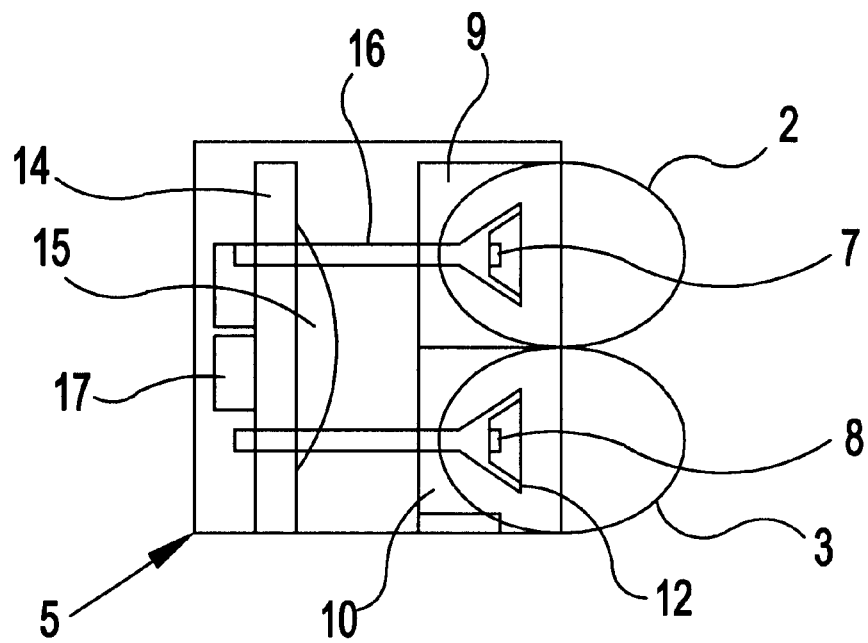
FIG. 3 shows a side view of the first embodiment of the present invention detailing a side view of the stacked arrangement of the transmission lenses along the vertical direction.

FIG. 3 shows a side view of the emitter modules (9, 10). Each emitter module (9, 10) may be assembled separately or they may be molded together. The emitter modules (9, 10) include a pair of infrared LEDs (pair 7, pair 8) mounted in a metal leadframe (16) that also serves as a reflector cup (12). The LEDs (7, 8) are connected in parallel. In the embodiment depicted, the reflector cup (12) acts as a common cathode connection. The anodes of the LEDs (7, 8) are wirebonded to separate outputs. It can be appreciated that the anodes and cathodes can be connected in other ways. The leadframe (16) and LEDs (7, 8) are encapsulated with transparent epoxy to form a body of the emitter module (9, 10) and to provide structural rigidity. The outer surface of the encapsulate is shaped to form an emitter lens (2, 3) shaped into a half ellipsoid to obtain an appropriate asymmetric optical profile. The emitter module (9, 10) is coupled to a control integrated circuit (IC) (15) via a circuit board (14). Other components (17) are also coupled to circuit board (14) for power and signal conditioning purposes. The components are then placed within a housing (5) that supports the components. The housing (5) may advantageously provide a metal shield for providing EMI immunity.

Figure 4:
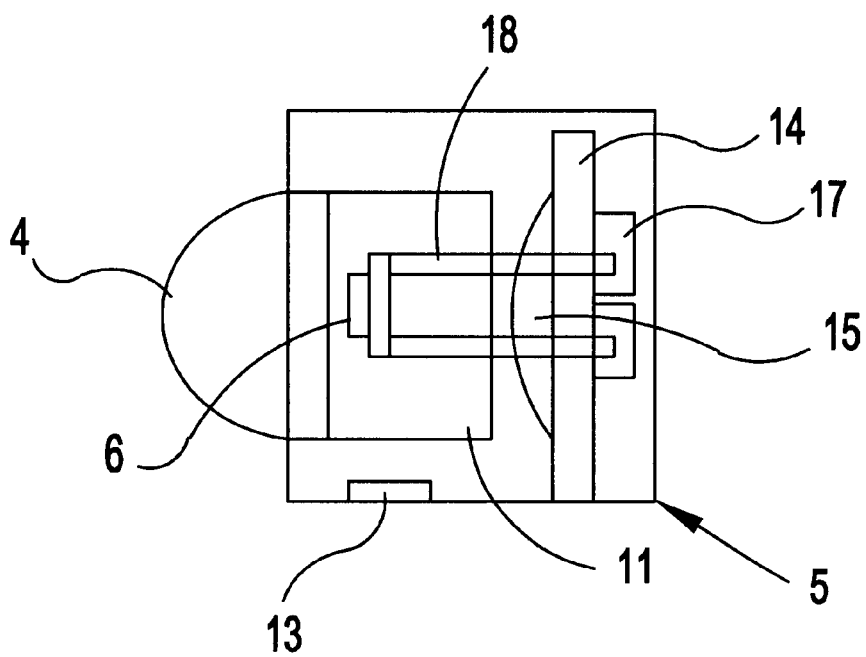
FIG. 4 shows another side view of the first embodiment of the present invention detailing a side view of the receiving lens and photodetector.

FIG. 4 shows the side view of the receiver module (11). Two photodetectors (6) are mounted and wirebonded on a separate leadframe (18) and encapsulated to form the body of the receiver module (11). The encapsulate is formed into a receiver lens (4) shaped into a half ellipsoid to provide a field of view in the form of a suitable asymmetric optical profile. The receiver module (11) is coupled to a control IC (15) via a substrate or a circuit board (14), in a manner similar to the emitter modules (9, 10).

Figure 5:
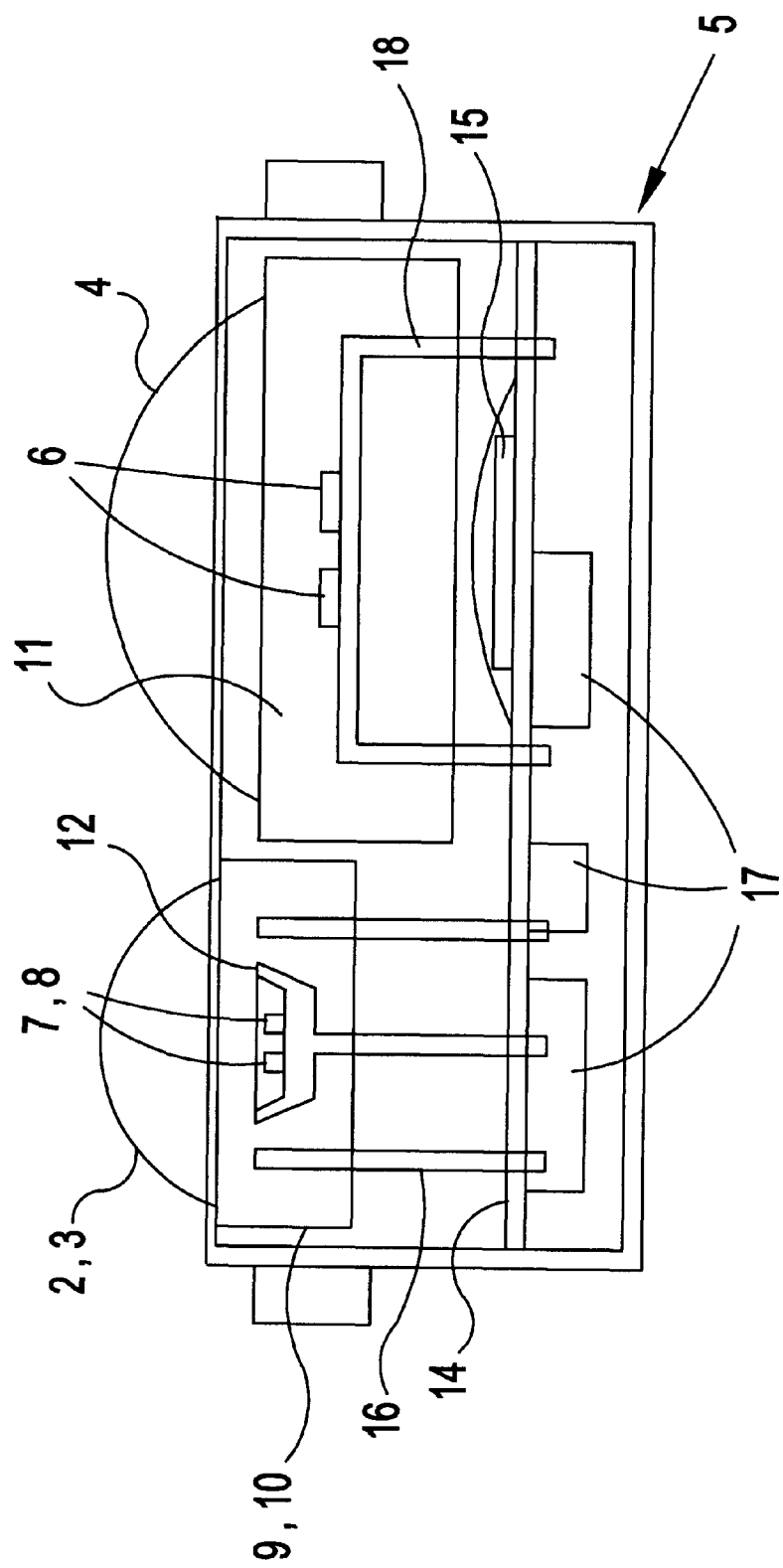
FIG. 5 shows a frontal side view of the embodiment of the present invention.

FIG. 5 shows a side view of the transceiver (1) in which the emitter modules (9, 10) and the receiver module (11) are shown along the major axes of the lenses (2, 3, 4).

Alternatively, the transceiver (1) may be manufactured using integrated circuit techniques in which the LEDs (7, 8) and photodetector (6) are physically bonded directly to a substrate, wirebonded to connect signals to and from these components (6, 7, 8), and then 'over-molded' with transparent material (i.e., an encapsulant) to encapsulate and protect the components. We have found that a silicon photodetector could be used in the visible and infrared light regions. The outer surface of the encapsulate is formed into the appropriate shape to function as the lenses for the components (6, 7, 8). The encapsulant should be capable of filtering out non-infrared so that the photodetector receives only infrared light if the communications system operates in the infrared light region.

FIG. 6 shows a cross section of the optical power distribution of the asymmetrically shaped optical profile of the lenses (2, 3, 4). A-direction (20) is the power distribution along the major axes of the lenses, and B-direction (22) is the power distribution along the minor axes of the lenses.

Figure 7:
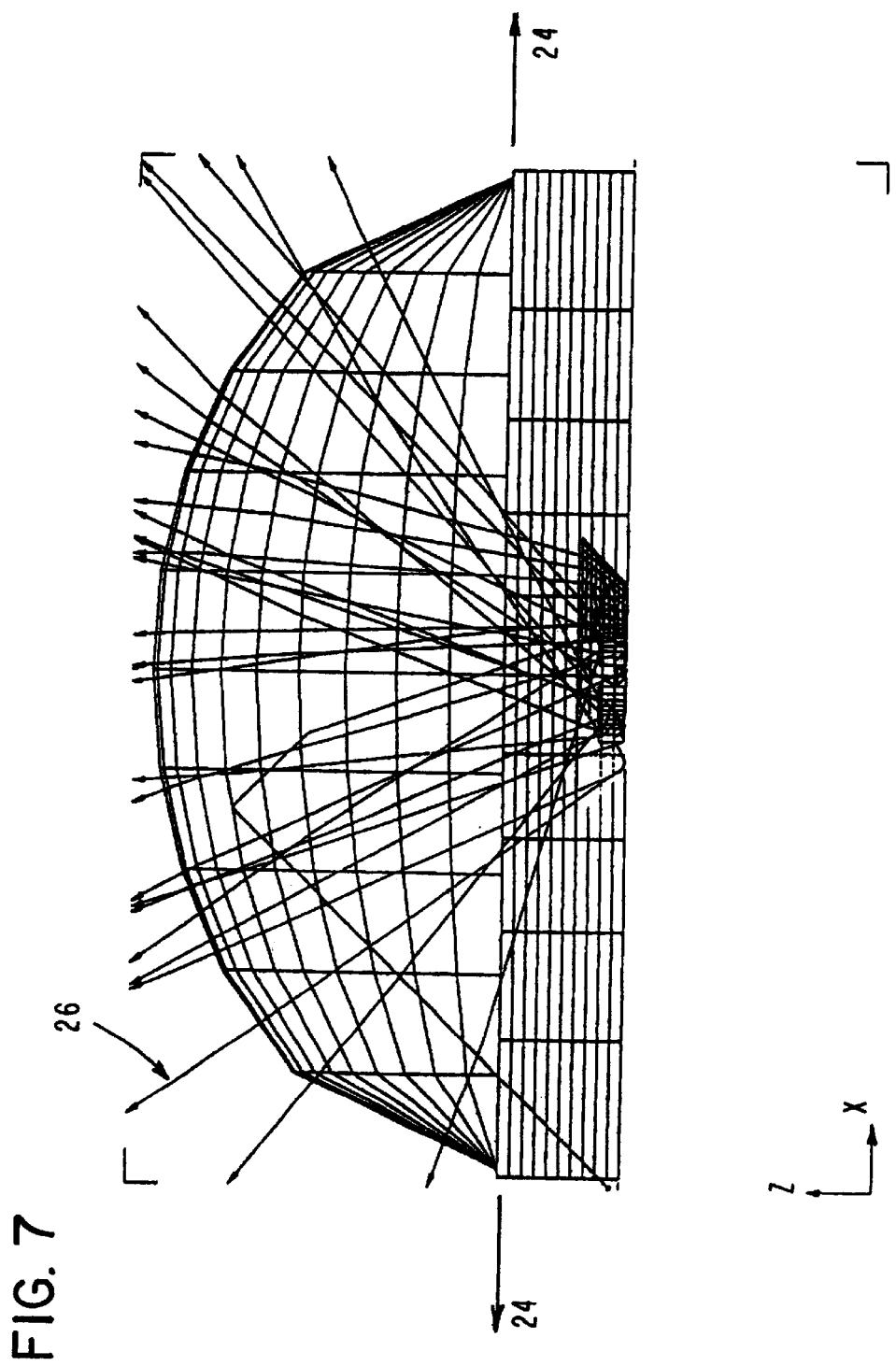
FIG. 7 shows a cross sectional perspective of the emitter lens along the major axis.

FIG. 7 shows a cross sectional perspective of an emitter lens (2, 3) along its major axis (24). Exit rays (26) plot the direction that the optical rays take to exit from the emitter lens (2, 3).

Figure 8:
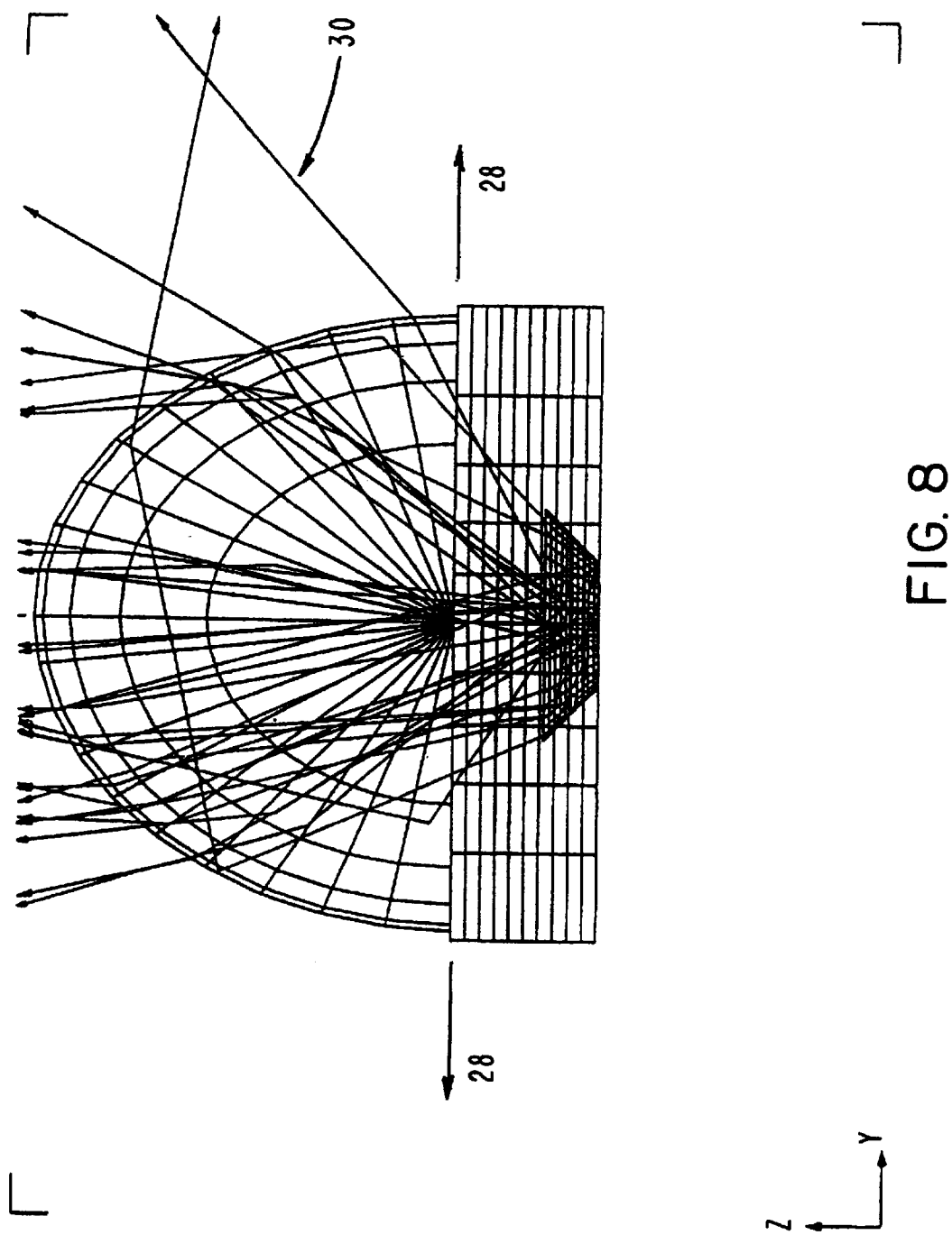
FIG. 8 shows a cross sectional perspective of the emitter lens along the minor axis.

FIG. 8 shows a cross sectional perspective of an emitter lens (2, 3) along its minor axis (28). Exit rays (30) plot the direction that the optical rays take to exit from the emitter lens (2, 3).

Figure 9:
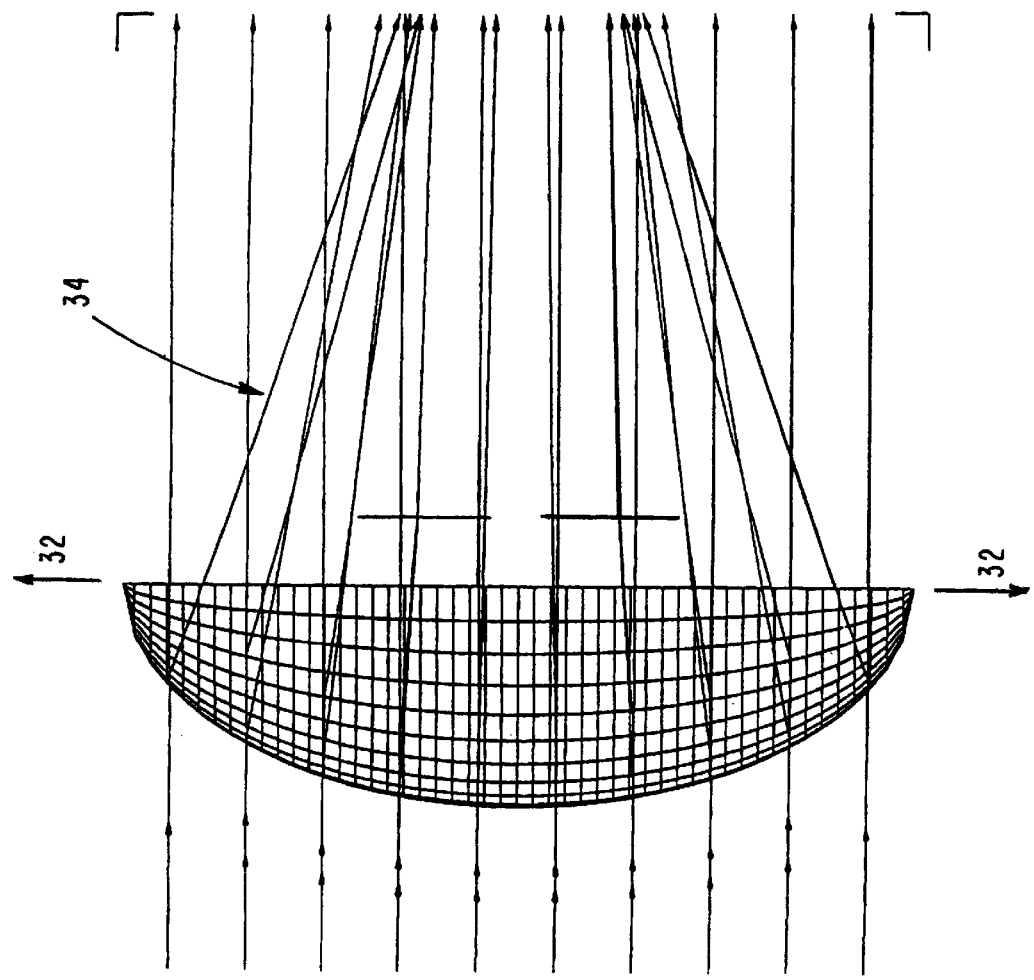
FIG. 9 shows a cross sectional perspective of the receiver lens along the major axis.

FIG. 9 shows a cross sectional perspective of a receiver lens (4) along its major axis (32). Entrance rays (34) plot the direction that the optical rays take to enter the receiver lens (4).

Figure 10:
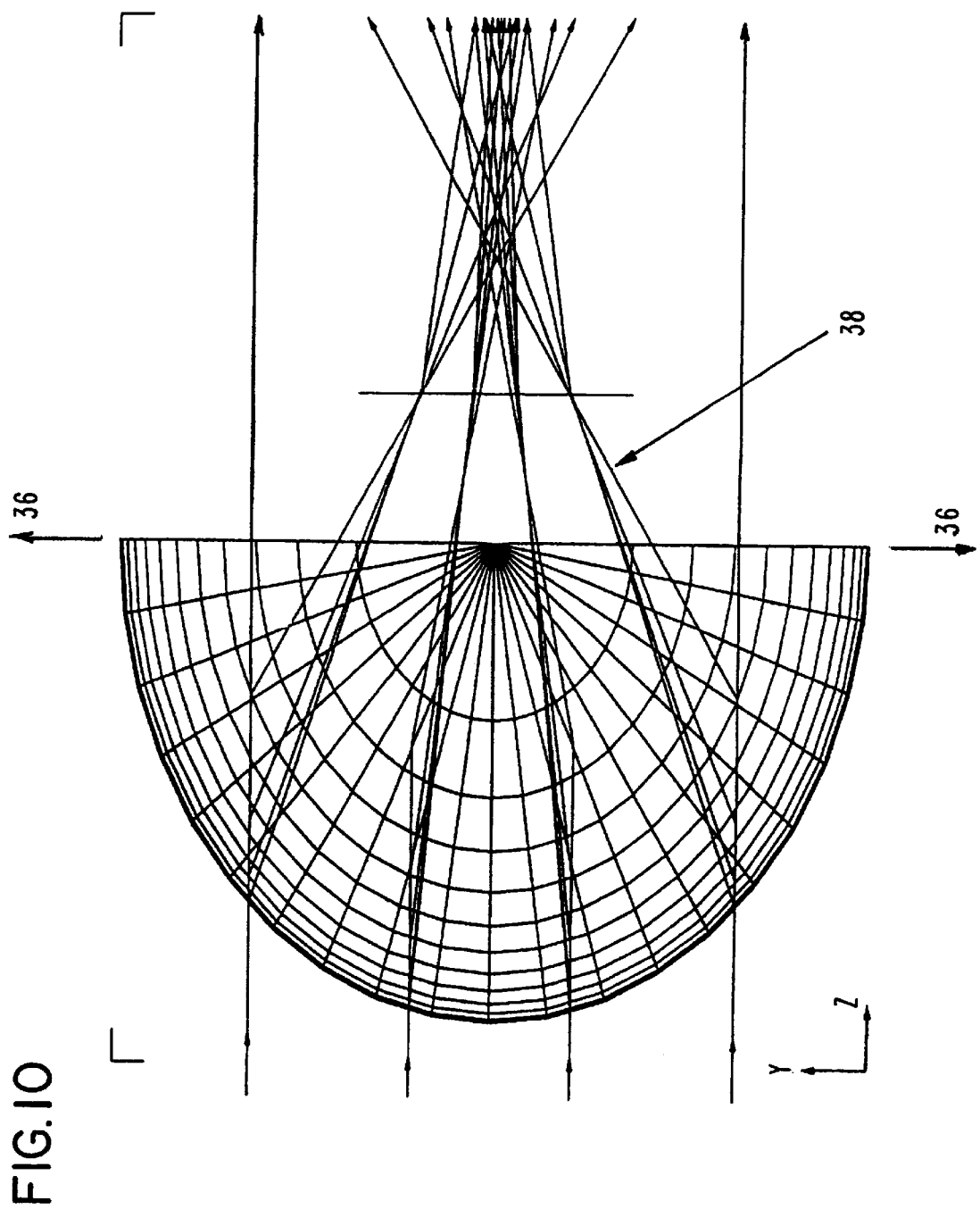
FIG. 10 shows a cross sectional perspective of the receiver lens along the minor axis.

FIG. 10 shows a cross sectional perspective of a receiver lens (4) along its minor axis (36). Entrance rays (38) plot the direction that the optical rays take to enter the receiver lens (4).

Changes and modifications to the described embodiment may be made without departing from the scope or spirit of the invention. The scope of the invention is intended to be limited by the scope of the appended claims.

The embodiments of the invention in which an exclusive property or privilege is claimed are defined as follows:

1. A transceiver for receiving and transmitting optical signals within an asymmetrically shaped optical profile comprising:
   (a) an emitter group having at least one emitter module, said at least one emitter module comprising:
      (i) at least one emitter element for emitting an output optical signal in response to an output electrical signal;
      (ii) an ellipsoidally-shaped emitter lens element having orthogonal major and minor axes disposed in relation to said at least one emitter element to confine light emitted from said at least one emitter element within said profile;
   (b) a receiver group having at least one receiver module, said at least one receiver module comprising:
      (i) at least one receiver element for producing an input electrical signal in response to receiving an input optical signal;
      (ii) an ellipsoidally-shaped receiver lens element having orthogonal major and minor axes disposed in relation to said at least one receiver element to confine light received by said receiver lens within said profile onto said at least one receiver element;
   (c) wherein the major axis of each ellipsoidally-shaped emitter lens element is parallel to the major axis of each ellipsoidally-shaped receiver lens element and wherein said emitter and receiver modules are disposed on said transceiver in staggered parallel spaced relation to each other with respect to their minor axes so that light emitted from said at least one emitter element within said profile does not optically interfere with light received by said receiver lens within said profile.

2. The transceiver of claim 1, wherein
   (a) said emitter group comprises a plurality of spaced emitter modules aligned in a column along their minor axes;
   (b) said receiver comprises a plurality of spaced receiver modules aligned in a column along their minor axes;
   (c) said columns of said modules are disposed in parallel spaced relationship with each other; and
   (d) said emitter modules are staggered with respect to said receiver modules in their respective columns.

3. The transceiver of claim 1, wherein
   (a) said emitter comprises two spaced emitter modules aligned in a column along their minor axes, and said receiver group comprises one receiver module; and
   (b) said receiver module is staggered with respect to said emitter modules and offset therebetween.

4. The transceiver of claim 1, wherein said transceiver is a infrared transceiver.

5. The transceiver of claim 4, wherein said receiver element is a photodetector sensitive to infrared light and said emitter element is a infrared emitting diode.

6. The transceiver of claim 5 further comprising an encapsulant capable of filtering out non-infrared light from reaching said photodetector.

7. The transceiver of claim 1, claim 3, or claim 5, wherein said lenses are half ellipsoid in shape.

8. The transceiver of claim 4, claim 5, or claim 6, including means to operate asynchronously said emitter and receiver elements.

9. The transceiver of claim 4, claim 5, or claim 6, including means to operate asynchronously said emitter and receiver elements.

10. A communication system for receiving and transmitting optical signals within an asymmetrically shaped optical profile comprising:
    (a) an emitter group having at least one emitter module, said at least one emitter module comprising:
       (i) at least one emitter element for emitting an output optical signal in response to an output electrical signal;
       (ii) an ellipsoidally-shaped lens element having orthogonal major and minor axes disposed in relation to said at least one emitter element to confine light emitted from said at least one emitter element within said profile;

(b) a receiver group having at least one receiver module, said at least one receiver module comprising:
  (i) at least one receiver element for producing an input electrical signal in response to receiving an input optical signal;
  (ii) an ellipsoidally-shaped lens element having orthogonal major and minor axes disposed in relation to said at least one receiver element to confine light received by said receiver lens within said profile onto said at least one receiver element;

(c) wherein the major axis of each ellipsoidally-shaped lens element disposed in relation to said at least one emitter element is parallel to the major axis of each ellipsoidally-shaped lens element disposed in relation to said at least one receiver element and wherein said emitter and receiver modules are disposed on said transceiver in staggered parallel spaced relation to each other with respect to their minor axes so that light emitted from said at least one emitter element does not optically interfere with light received by said lens element disposed in relation to said at least one receiver element.

11. The apparatus of claim 1, claim 3, or claim 10, wherein said asymmetrically shaped profile has an oblong shape when viewed in a plane parallel to the major and minor axes of said lenses, said oblong shape having an oblong major axis corresponding to the major axes of said lenses, and an oblong minor axis corresponding to said minor axes of said lenses.

\* \* \* \* \*